United States Patent [19]

Dolin, Jr. et al.

[11] Patent Number: 5,327,426
[45] Date of Patent: Jul. 5, 1994

[54] METHOD AND APPARATUS FOR PREVENTING UNNECESSARY RETRANSMISSION OF MESSAGES IN A NETWORKED MESSAGING SYSTEM

[75] Inventors: Robert A. Dolin, Jr., Menlo Park; Darron W. Fick, San Jose; Glen M. Riley, Los Gatos, all of Calif.

[73] Assignee: Echelon Corporation, Palo Alto, Calif.

[21] Appl. No.: 766,846

[22] Filed: Sep. 27, 1991

[51] Int. Cl.[5] .............................................. H04J 3/02
[52] U.S. Cl. ................................................... 370/85.13
[58] Field of Search ................. 370/85.13, 85.14, 85.9, 370/94.1, 94.3, 94.2, 85.1; 340/825.05, 825.47

[56] References Cited

U.S. PATENT DOCUMENTS

| | | | |
|---|---|---|---|
| 4,627,052 | 12/1986 | Hoare et al. | 370/85.13 |
| 4,707,827 | 11/1987 | Bione et al. | 370/85.13 |
| 4,737,953 | 4/1988 | Koch et al. | 370/85.13 |
| 4,809,265 | 2/1989 | Hart et al. | 370/85.13 |
| 5,018,137 | 5/1991 | Backes et al. | 370/85.13 |
| 5,081,133 | 5/1991 | Tsukakoshi et al. | 370/85.6 |
| 5,121,382 | 6/1992 | Yang et al. | 370/31 |

Primary Examiner—Douglas W. Olms
Assistant Examiner—Dang Ton
Attorney, Agent, or Firm—Blakely, Sokoloff, Taylor & Zafman

[57] ABSTRACT

An improved apparatus and method for routing of messages in a networked system wherein reduced unnecessary retransmission of messages across routers is achieved by examining the address of the source of messages to be forwarded and, if the source of the message is on the transmit side of the router, not retransmitting the message. Further, when messages are originated which do not include source subnet address information, a router receiving such a message will update the source subnet address field of the message with its own source subnet address so as to allow other routers to use the updated source subnet address information in making routing decisions.

23 Claims, 14 Drawing Sheets

| Source domain 801 | Source Subnet 802 | Source Node ID 803 | Destination Address 804 (See Table III) | Message Type 805 | Message 806 |

FIGURE 8

METHOD AND APPARATUS FOR PREVENTING UNNECESSARY RETRANSMISSION OF MESSAGES IN A NETWORKED MESSAGING SYSTEM

BACKGROUND OF THE INVENTION

1. FIELD OF THE INVENTION

The present invention relates to the field of systems for distributed computing, communication and control and, more specifically, to the area of communication of information between devices in a distributed computing environment.

2. DESCRIPTION OF THE RELATED ART

There are a large number of networks known in the art which networks allow for communication of messages between nodes that make up the networks. In such networks, a node may transmit a message (referred to herein alternatively as the "transmitting node", the "origin node", or the "source node"). The message may be received by another node (where the other node is not the intended final destination node of the message). This node will be referred to herein as an "intermediate node" and, sometimes, more specifically, is referred to as a "router node". The intermediate node then retransmits the message. This process of receiving and retransmitting the message may continue through one or more additional intermediate nodes until, finally, the message reaches the final intended destination node or nodes (referred to herein as the "destination node").

Of course, in such a system, designs must provide for retransmission of the message until it reaches the desired destination node(s). However, it is important in such designs that the message is not repeatably retransmitted throughout the network after the message is finally received by the destination node(s) because such retransmission will increase, unnecessarily, traffic on the network. In fact, as will be seen, in certain scenarios, it is possible for such retransmission to continue infinitely until the network is reset.

The present invention offers an improved method of communicating messages between nodes in such a network which provides for reduced unnecessary retransmission of messages from node-to-node within the network. In order to describe problems solved by the present invention, it may be useful to refer to FIG. 1.

In FIG. 1, a network is illustrated having 18 nodes referred to with reference numerals 110-128. In this network, nodes 110-114 are members of subnet 1 102 of domain 1 131. Nodes 116-119 are members of subnet 2 103 of domain 1 131. Nodes 120-124 are members of subnet 2 103 of domain 2 132 and nodes 125-128 are members of subnet 1 104 of domain 2 132. Nodes 114, 116, 119, 122, and 125 are each router nodes which provide for routing of messages between nodes in different subnets. As will be explained in greater detail below, nodes may include in transmitted messages their node id (source node id), subnet (source subnet), and domain (source domain) and, in the case of group messages, a destination group id.

It is first useful to assume for a first example that nodes 110, 111 and 118 are each members of the same group (i.e., group 1). FIG. 2(a) illustrates a prior art method of transmitting a group message from node 110 to other nodes in the group (e.g., nodes 111 and 118). Initially, node 110 may format a message and transmit on media 161, block 201. The message is received and processed by node 111, block 202. (Nodes 112 and 113 may also sense the message but reject it because it is addresses a group 1.) Node 114 also receives the message, block 203. Node 114 is a router node and, therefore, accepts the message even though it is not a member of the group designated by the message. Node 114 then transmits the message, for example, by RF signals, block 114. In the described network, the message should be received by node 119, block 206 so that it might be retransmitted on media 155 for reception by node 118 (the third node in group 1). As illustrated, the message is received by node 119, block 206, and is retransmitted on power line 155, block 208, so that it is received by node 118, block 210. (The message retransmitted by node 119 is also received by node 116 which may retransmit the message. This will be explained in greater detail below. In addition, the message is received by node 117, however, because this node is not in group 1, the message is ignored. Finally, the message is received by nodes 125-28 which also ignore the message because these nodes are not members of domain 1 131.)

Importantly, the message retransmitted from node 114 may also be received by node 116, block 205 (and by nodes 122 and 125, block 207). If received by node 116, the message will be retransmitted on power line 155 by node 116, block 209. It will be again received by node 118 (and preferably ignored as a duplicate) as well be being received by nodes 117 and 126-128. However, it will also be received by node 119, block 211, which will retransmit the message, block 212. The message, retransmitted by node 119 may again be received by node 116 and a seemingly infinite loop is then created. (Of course, the message may also be rereceived by node 114, creating similar problems.) If the message is received by nodes 122 or 125, it will be ignored because nodes 122 and 125 are not members of domain 1 131.

Many networked computing systems have avoided dealing with the above-described problem. For example, certain networks only allow transmission over wire media. This provides for control over recipients of messages. Other systems implement a "hop count" which is transmitted with the message. Each time the message is received by a router node, the hop count is incremented and, when it exceeds a predetermined maximum, the message is no longer retransmitted by the router nodes. Of course, neither of these solutions is ideal.

Therefore, what is required is a system in which messages are retransmitted in such a manner that the message is received by each intended recipient but also such that unnecessary retransmission of the message is not required. Such a system should be media independent.

A second class of problems may also be described with reference to FIG. 1 and, now, with reference to FIG. 2(b). Assume in this example, that node 110 is unconfigured (an "unconfigured node" as that term is used herein has not yet been assigned a domain and subnet address and is therefore unable to transmit source domain and subnet information with messages). In the system of the preferred embodiment, node 110 may format and broadcast a message before it has been configured-for example, node 110 may be requested to transmit its node id onto the network. However, without source domain or source subnet address information, there is no information in the packet to tell the routers how to route the packet.

In the preferred embodiment, node 110 may be requested to transmit its node id by activating a "service pin" which is a hardware pin on node 110 specially designated to cause transmission of a message which broadcasts the node's node id. It is worthwhile to briefly note that in the system of the preferred embodiment, all nodes are assigned unique 48-bit node ids at the time of their manufacture; therefore, even an unconfigured node has a node id. This assignment of unique 48-bit node ids is better described with reference to U.S. Pat. No. 4,918,690 Markkula Jr. et al. titled "Network and Intelligent Cell for Providing Sensing, Bidirectional Communications and Control" which patent is assigned to the assignee of the present invention.

The message broadcast by node 110 is received by nodes 111 and 112, block 222. The message is also received by node 114, block 223, and retransmitted, block 224. The message may then be received by any or all of nodes 119, block 226, node 116, block 225, or nodes 122 and 125, block 227. Whether or not each of these nodes received the transmitted message depends on a number of factors including the strength of the signal transmitted by node 114 and the capability of each of nodes 119, 122 and 125 to receive messages. However, the networked computing system should be designed to operate properly in the event any of these nodes receives the message.

The example of FIG. 2(b) illustrates further detail of the communication process after the message is received by nodes 119 and 116. In the case of a message received by node 119, block 226, node 119 may retransmit the message on power line 155, block 228, and it will be received by nodes 116–118 and 125–128, block 230. Node 116 may then retransmit the message, block 233 and it may then be again received by node 119 (among other possible nodes). This, of course, creates a potentially infinite loop of retransmission. The message being received by node 116, block 225, creates similar problems wherein node 116 retransmits on power line 155 and node 119 (among others) receives the message, block 231, and retransmits, block 232, again creating a potentially infinite loop. (It might be noted that preferably nodes 125–128 will ignore the message because they are not members of the proper domain).

Again, what is desired is to develop a system in which unnecessary retransmission of messages (and especially potentially infinite loops) are reduced, avoided or eliminated.

These and other objects of the present invention will be better understood with reference to the Detailed Description of the Preferred Embodiment, the accompanying drawings, and the claims.

SUMMARY OF THE INVENTION

A method and apparatus for reducing and preventing the unnecessary and unwanted retransmission of messages in a networked messaging system is described. In the present invention, a network may comprise a first node capable of at least communicating information, a second node capable of receiving the communicated information, and a third node for receiving the communicated information from the first node and routing the communicated information to the second node. The first and second nodes may both be members of a first group of nodes. For example, the first group of nodes may operate to cooperatively sense and control an environment. The first node may further be a member of a first subnet of nodes and the communicated information may comprise, among other data, address information of the first node including information identifying the first subnet. The second node may be a member of a second subnet of nodes.

The third node of the present invention may comprise a first side which is coupled to communicate messages with the first subnet and a second side which is coupled to communicate messages with the second subnet. The third node may also comprise means for determining whether a message was received on the first side or the second side, means for comparing the address information identifying the first subnet with the subnet of the side on which the message was received, and means for controlling retransmission of the message based on such comparison.

In this way, a message received on the first side may be selectively retransmitted onto the second subnet only if the message originated from the first subnet (and, not if the message originated from the second subnet). Importantly, this method reduces unnecessary retransmission of messages on the network.

The present invention further reveals method of communicating information in the just described network.

In the present invention, a node on the network may be unconfigured (the term unconfigured having been better defined above in the discussion of the background of the invention). In such a case, the node cannot include identifying information in transmitted messages which identifies its domain/subnet as being the domain/subnet of origin. Therefore, in such cases where the sending node is unconfigured, it is taught to transmit messages with the domain/subnet fields being set to a first value indicating the node has not yet been assigned to a domain/subnet. A router node, receiving such a message, may replace the first value with a second value and then retransmit the message. The second value preferably identifies a domain/subnet to which the router node is configured. The retransmitted message is then received by a third node.

These and other aspects of the present invention will be apparent to one of ordinary skill in the art with further reference to the below Detailed Description of the Preferred Embodiment and the accompanying drawings.

BRIEF DESCRIPTION OF THE DRAWINGS

FIG. 8 is an illustration of certain fields included in messages transmitted by nodes of the present invention.

Figure 1:
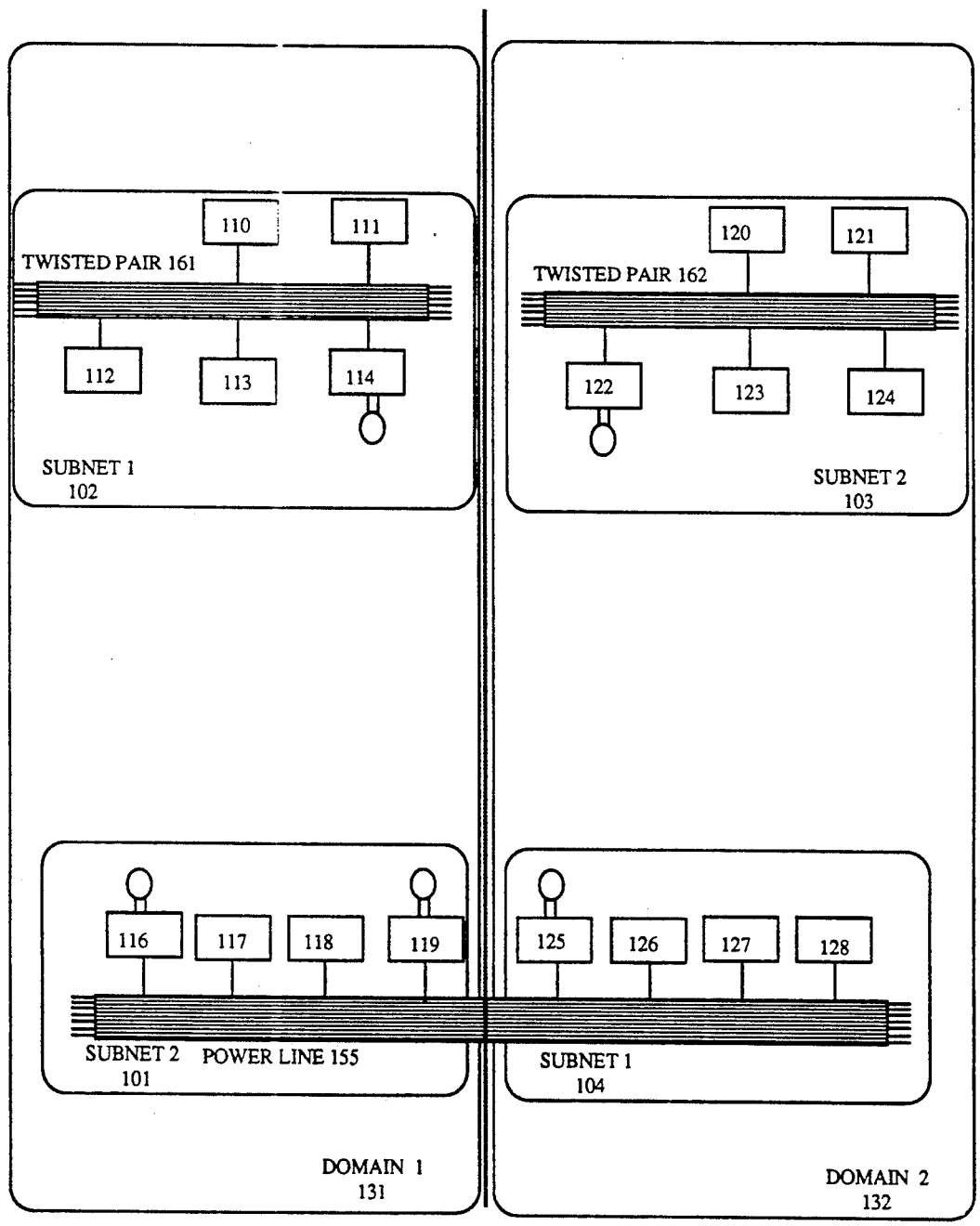
FIG. 1 is a diagram illustrating a network as may be implemented utilizing the present invention.
Figure 2A:
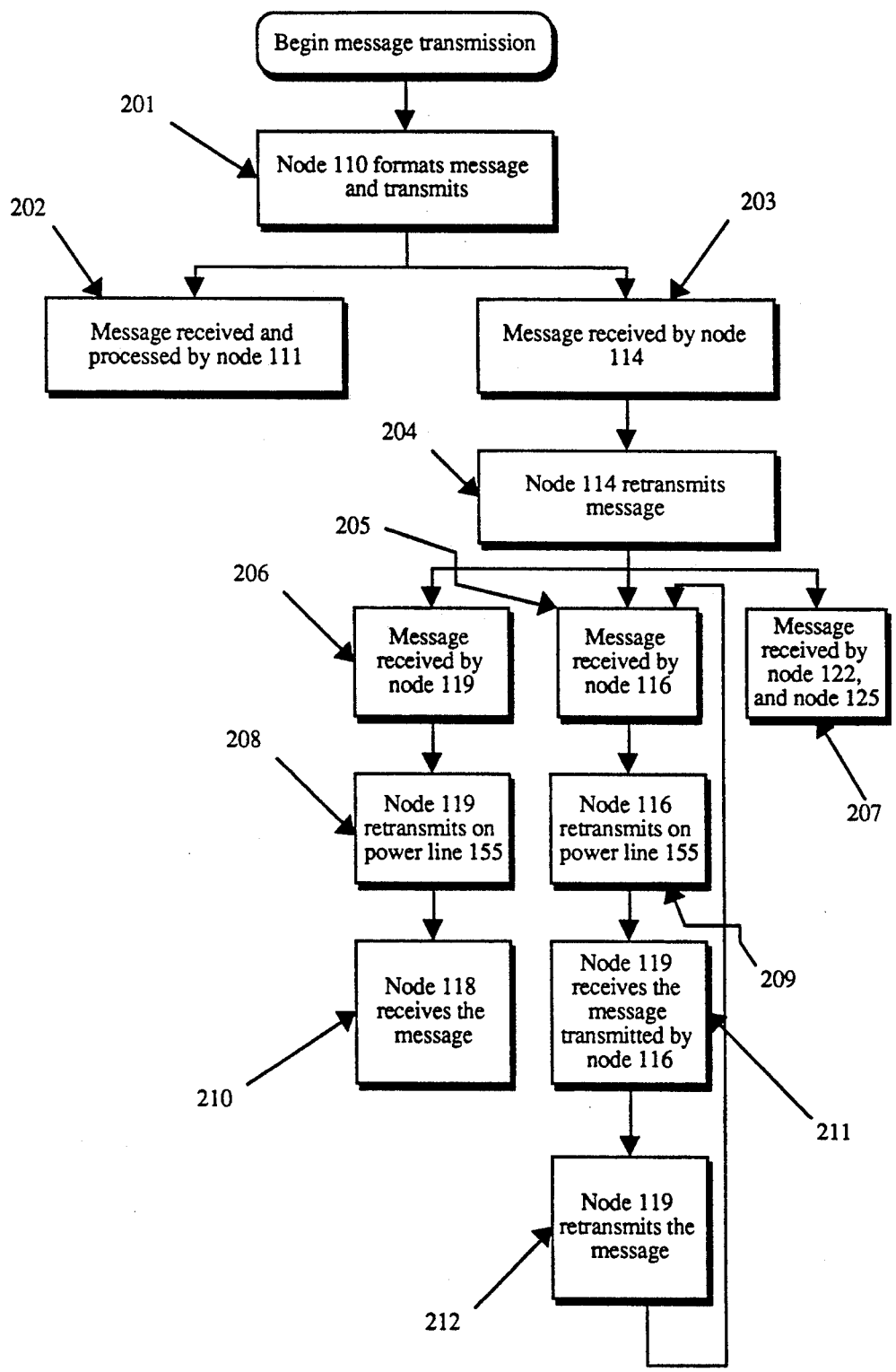
FIG. 2(a) and 2(b) are flow diagrams illustrating prior art methods of communicating messages in a networked system.
Figure 2B:
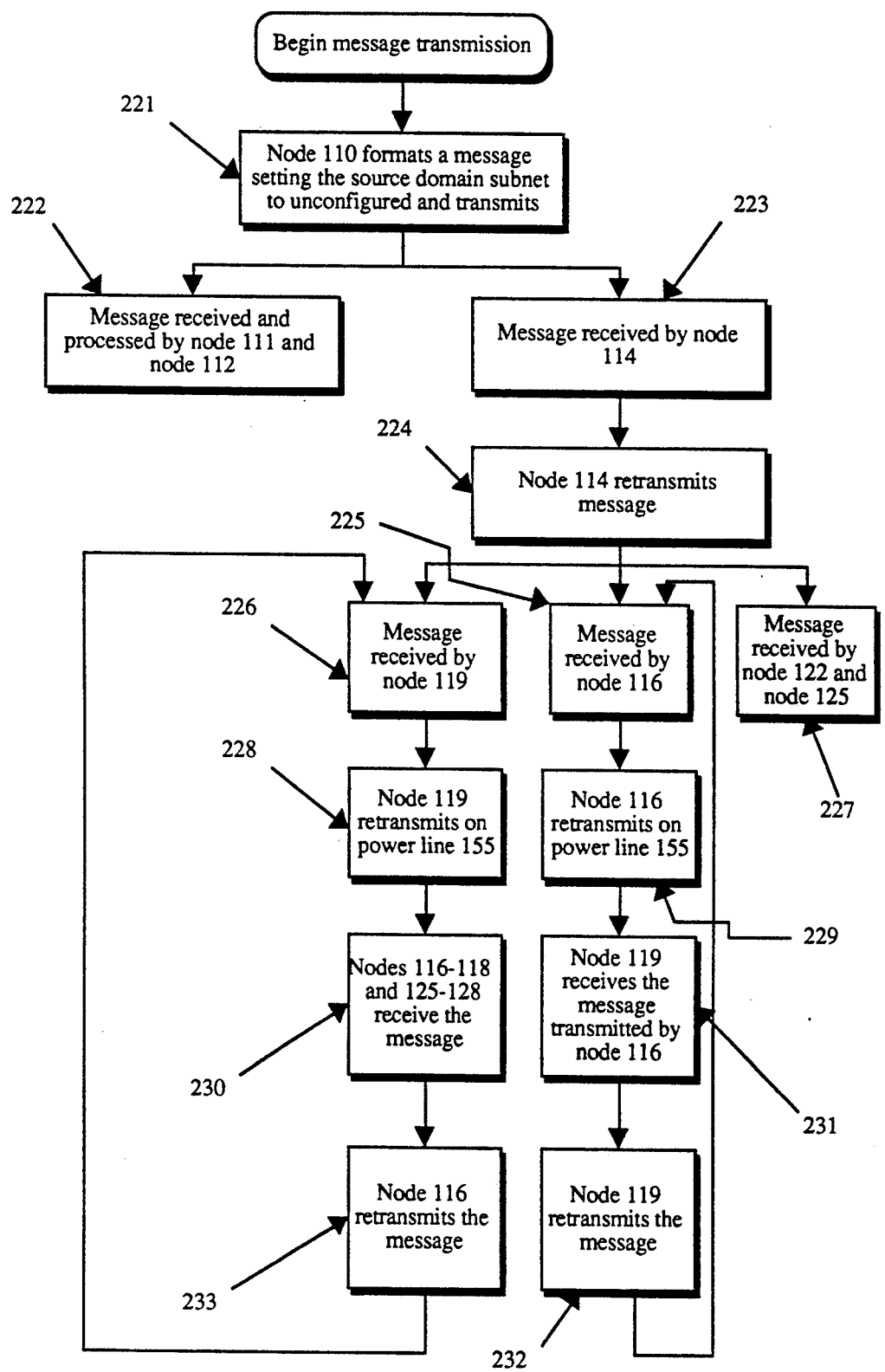
Figure 3:
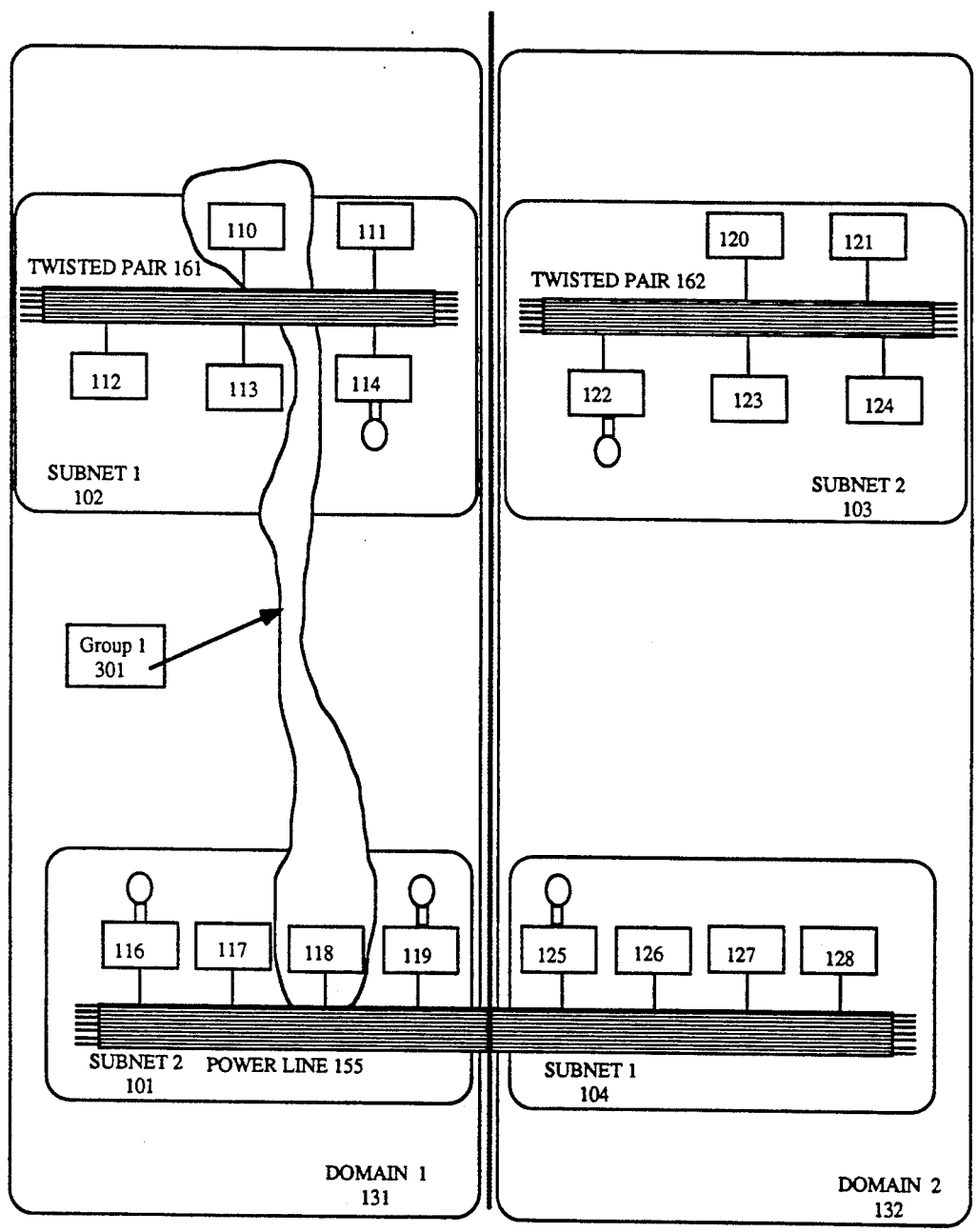
FIG. 3 is a diagram illustrating the network of FIG. 1 and further illustrating a group of nodes as may be defined in the system of the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE PREFERRED EMBODIMENT

What is described herein is an improved method and apparatus for reducing and preventing the unnecessary retransmission of certain types of a messages in a networked messaging environment. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Background references which are applicable to the system of the present invention Perhaps before beginning to describe the preferred embodiment of the present invention in detail it is worthwhile to reference U.S. Pat. No. 4,918,690 Markkula et al. titled "Network and intelligent cell for providing sensing, bi-directional communications and control" (referred to herein as the '690 patent) which patent is commonly assigned to the assignee of the present invention and discloses technology relating to networked messaging systems. This patent may be useful to an understanding of the preferred embodiment of the present invention.

U.S. patent application Ser. No. 07/621,738 Dolin Jr. et al. titled "Configuration Device for Use In a Networked Communication System" filed Dec. 3, 1990 (hereinafter the '738 application) also discloses technology relating to networked messaging systems. This application may be useful to an understanding of the preferred embodiment of the present invention and, specifically, to an understanding of configuration of nodes through messages transmitted responsive to activating a service pin as may be utilized by the system of the present invention. As is stated in the '738 application, when the service pin of a node is activated, the node transmits a message on the network broadcasting its node id and node type.

Now, it is worthwhile to turn to more detailed discussion of the present invention and its preferred embodiment.

OVERVIEW OF THE NETWORK OF THE PRESENT INVENTION

The network of the preferred embodiment is of the type which provides for sensing, control and communication.

For example, the network of the preferred embodiment may be employed in a building such as an office building and provide for such functions as sensing temperatures in various locations in the building, communicating the sensed temperatures and controlling furnaces and ventilation to selectively heat areas of the building.

It is desirable to provide for installation of a network of the type of the preferred embodiment in existing, as well as new, structures and to provide for such installation at minimal cost while providing for maximum ease of installation. In this regard, nodes of the network of the present invention may be coupled with any of several types of media, for example: twisted pair wiring, power lines, radio frequency (RF), etc. In this way, a network may be installed utilizing largely existing communication media. This is illustrated, for example, by FIG. 1 which shows subnet 1 102 of domain 1 131 and subnet 2 103 of domain 2 132. These subnets, subnet 1 102 and subnet 2 103, may be subnets installed within a first and a second house. FIG. 1 further illustrates subnet 2 101 of domain 1 131 and subnet 1 104 of domain 2 132. These subnets, subnet 2 101 and subnet 1 104, may be subnets associated with a power line 155.

Thus, it is illustrated in the network of FIG. 1 that nodes such as nodes 110–114, 116–119, 120–124, and 125–128 may be installed on existing twisted pair wiring and on existing power lines. Although the preferred embodiment is described with reference to these specific media, it is understood that the present invention is essentially media independent.

Certain of the nodes may be installed to function to sense external factors, such as the temperature in a room or activity on a media such as a telephone line; others of these nodes may be installed to control external devices, such as a heater or a telephone answering system. Still others of these nodes may be installed to facilitate communication between nodes in the network. Nodes 114, 116, 119, 122 and 125 of examples of a special type of node utilized by the network of the preferred embodiment to facilitate such communication known as a router node.

BLOCK DIAGRAM OF THE NODES OF THE PRESENT INVENTION

Each node, with the exception of router nodes, in a network of the preferred embodiment are implemented utilizing a NEURON ® CHIP available from Motorola and Toshiba under license from Echelon Corporation of Palo Alto, Calif. The implementation of router nodes will be discussed in greater detail below with reference to FIG. 6. Presently there are two members of the NEURON CHIP family—the 3120 and the 3150. These two devices are similar in many respects and, therefore, only the 3150 will be described in any detail here with reference being made below to certain differences between the two members of the NEURON CHIP family. It might be noted that inventive aspects of the system described herein will perform equally well with either member of the NEURON CHIP family and, in fact, it will be obvious to those skilled in the art that inventive aspects of the system described may be accomplished with other implementations-such as, for example, an implementation where circuits of the NEURON CHIP are implemented as discrete or individual components or implementations using other integrated circuit modules.

Figure 7:
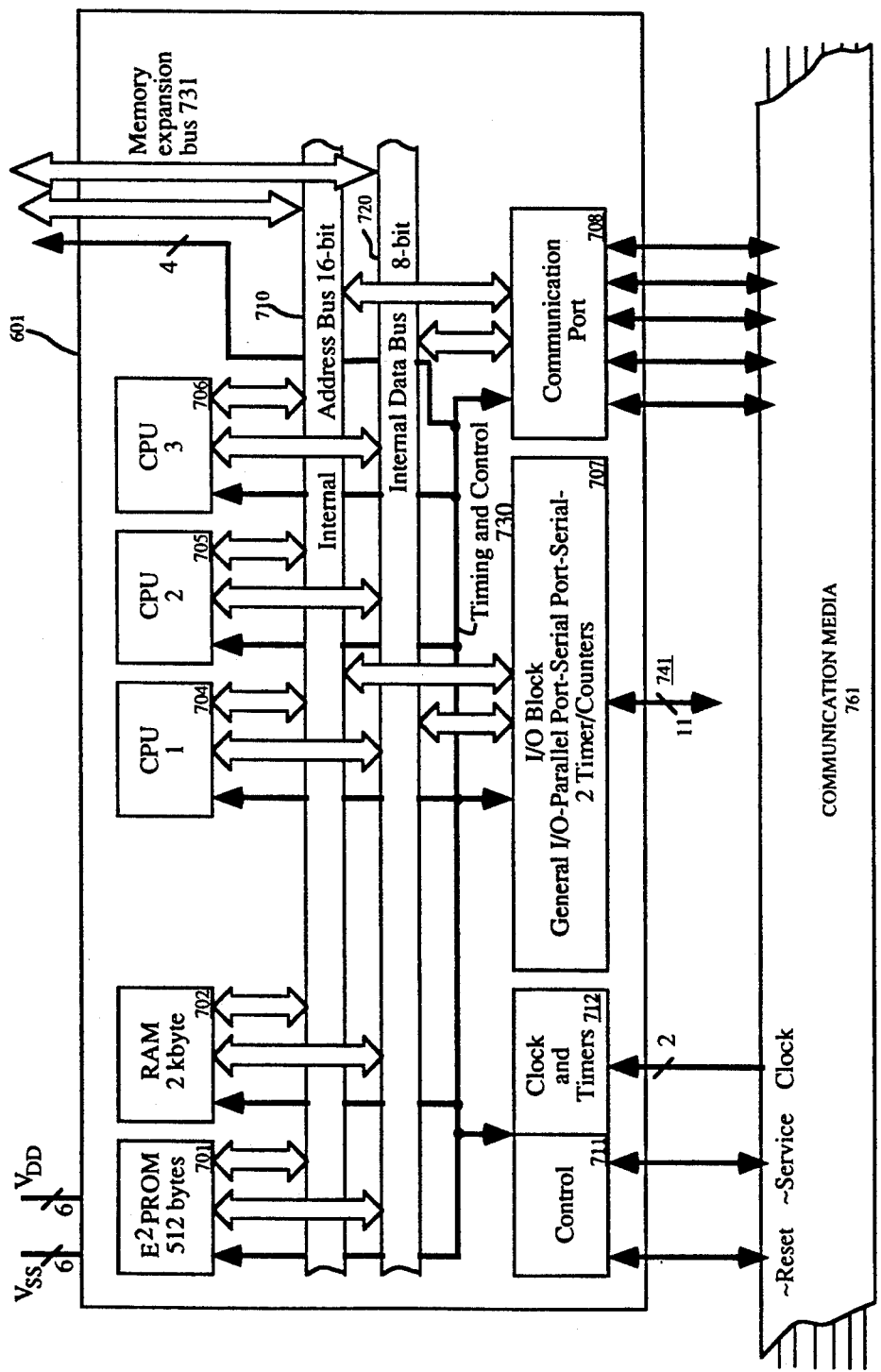
FIG. 7 is a block diagram of an integrated circuit chip which may be utilized in a node of the system of the present invention.

FIG. 7 illustrates in block diagram form a 3150 NEURON CHIP. Important to many features of the network of the preferred embodiment, each NEURON CHIP includes at time of manufacture, programmed in its EEPROM 701, a unique 48-bit identification number.

The NEURON CHIP is coupled in communication with media 761 through control 711, clock and timer circuitry 712, and communication port 708. The NEU- RON CHIP may be connected to an external transceiver for coupling with other media. The media 761 may be, for example, twisted pair wiring 161, twisted pair wiring 162, or power line 155. Of course, media 761 may be other types of communication media such as RF, etc. Control 711 comprises a reset line and a service pin line. The service pin line is discussed in significant detail in the '738 application and it is sufficient to state for purposes of an understanding of the present invention that activation of the service pin line will cause the node to transmit a broadcast message transmitting its 48-bit node ID and node type information.

In addition, the node provides a general purpose I/O port 707 allowing for communication with various external devices. The I/O port 707 comprises 11 I/O pins which may be custom configured in a number of different configurations including as 11 individually configurable digital inputs or outputs, as a parallel interface with 8 data and three control lines, or as 8 digital I/O pins and a 3 pin serial interface. Finally, the I/O port comprises two 16-bit counter/timers which may be multiplexed to certain of the pins to provide for time-domain inputs and outputs. This configurable pin set up allows the I/O section to be coupled with a large variety of external devices providing for relative ease in providing for communication with, sensing of, and/or control of such devices. Such devices may range from household appliances, to factory equipment, to automobile accessories. As will be seen, such devices may also include another NEURON CHIP, such as utilized by the preferred configuration of routers.

The node further comprises three separate processors 704-706, a random access memory 702, and an EEPROM 701. The processors 704-706 are useful for executing programs such as to provide for communication, sensing and control of information in the network. In the preferred embodiment, two of the processors are dedicated to protocol processing functions to support network communications and the third processor is available to for applications programs. The EEPROM 701 may be useful for storing certain data values which, although configurable, are not subject to frequent changes in value. Each of the processors 704-706, RAM 702, EEPROM 701, control 711, clock 712, I/O port 707, and communication port 708 are coupled in communication through internal address bus 710, internal data bus 720 and timing and control lines 730. The NEURON CHIP further comprises an external memory interface port 731 which supports up to 64 Kbytes of external memory.

The 3120 NEURON CHIP (not shown) includes, in addition to the circuitry just described, 10K bytes of on-chip ROM. However, the 3120 NEURON CHIP does not include the external memory interface port 731. Further, the 3120 NEURON CHIP includes only 1024 bytes of on-chip RAM instead of the 2048 bytes included in the 3150 NEURON CHIP.

DESCRIPTION OF THE ROUTER NODES OF THE PRESENT INVENTION

Router nodes allow for selective communication across two channels. The two channels may exist as two separate physical media, or the channels may coexist on the same physical media implemented, for example, as two differing carrier frequencies. Routers in the preferred embodiment may be designed as either learning routers, configurable routers or bridge routers. Learning routers monitor network traffic to "learn" the network topology. The learning routers uses the network topology information to selectively route messages between the channels. Bridge routers simply forward all packets received on one channel to the other channel. Configurable routers utilize routing tables (such as shown with reference to FIG. 6 as Tables 611 and 612) to selectively pass packets for a single domain between the two channels. The selective routing process is controlled by routing programs which are programmed into the router and which implement the routing rules given by the routing table. The routing rules of the preferred embodiment are discussed in greater detail below.

Router hardware

Figure 6:
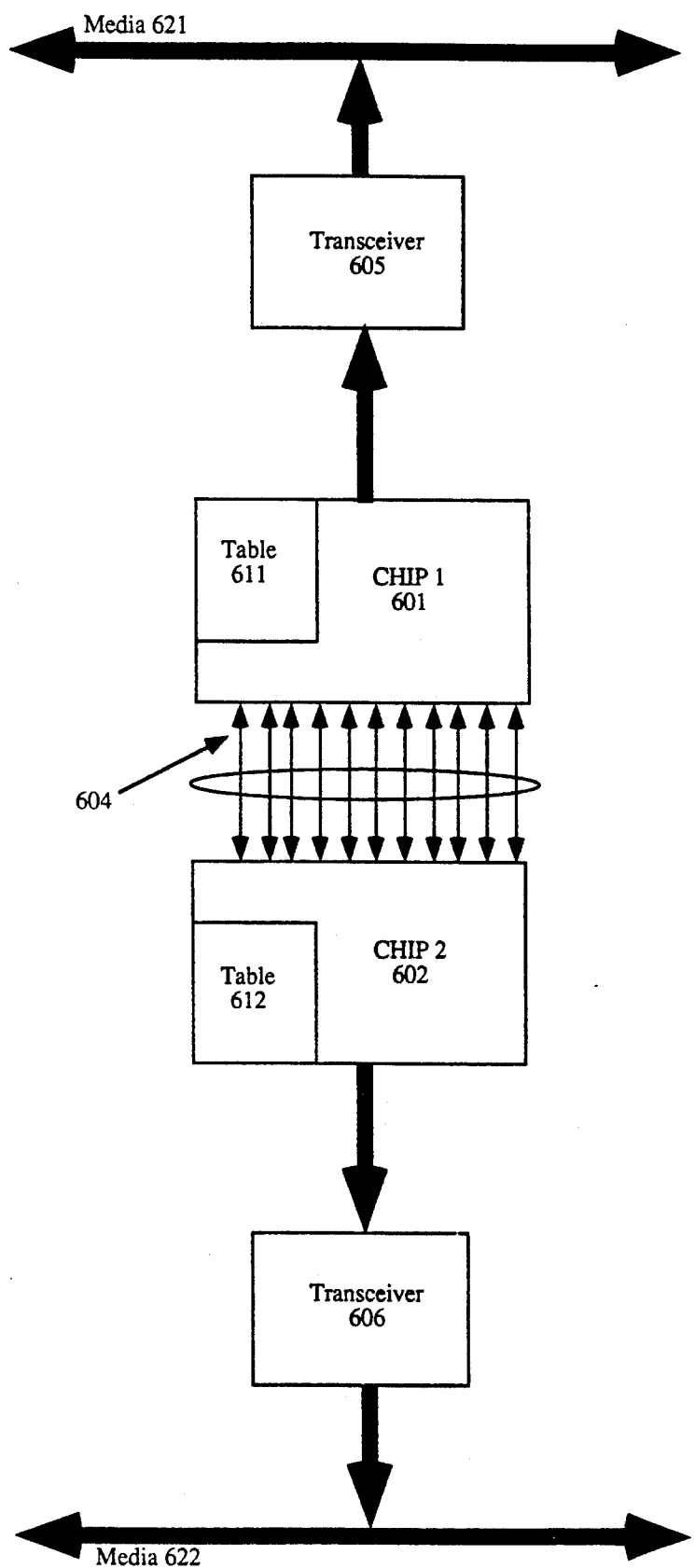
FIG. 6 is an overall block diagram of a router node as may be utilized by the system of the present invention.

FIG. 6 illustrates in block diagram from a router node of the present invention. A router node in the system of the preferred embodiment comprises two halves; a first half preferably comprising a NEURON CHIP 1 601 coupled with a transceiver 605 and a second half preferably comprising a NEURON CHIP 2 602 coupled with a transceiver 606. Of course, in alternative embodiments, devices other than NEURON CHIPS may be used. Therefore, in the remaining description, NEURON CHIP 1 601 will be referred to simply as chip 1 601 and NEURON CHIP 2 602 will be referred to simply as chip 2 602.

Chip 1 601 is coupled in communication with chip 2 602 over lines 604 allowing for communication between the two halves of the router.

In the preferred embodiment, each of chips 601 and 602 are implemented utilizing 3150 NEURON CHIPs and are coupled in communication utilizing their respective 11 I/O pins 741 (which pins are represented on FIG. 6 with lines 604). The chips (chip 1 601 and chip 2 602) are configured to allow eight bit parallel communication between the two devices across the I/O interface.

The chips 601 and 602 are each further coupled in communication with transceivers 605 and 606, respectively, through coupling of their respective communication ports 708, control circuitry 711, and clock/timers 712. The transceivers are each coupled with respective media, media 621 and 622. The media 621 and 622 may be, for example as illustrated by node 114, twisted pair 161 on one side and radio frequency on the other side. Of course, other combinations of media may be implemented without departure from the teachings of the present invention.

One half of the router is defined as a master half and the other half of the router is defined as the slave half. This designation of a master/slave relationship is implemented in the preferred embodiment to support the parallel interface between the two halves.

Message Packet Management

Each of the three processors on each half of a router node is responsible for one primary function (similar to the implementation of division of responsibility between processors in other nodes of the preferred embodiment). In specific, one processor is designated to support the MAC layer functionality of the network of the preferred embodiment (referred to as the MAC processor); a second processor is responsible for network management functions (referred to as the NET processor). This processor also is responsible for routing decisions and for passing packets to the third processor. The third processor (referred to as the IFC processor) is responsible for transferring and receiving data across the parallel bus (thus, this third processor is the processor discussed above responsible for executing application programs-in this case the application program being the program responsible for communication between the two halves of the router).

It is noted that once received by one half of a router, a message packet is stored in a packet buffer area until it is again retransmitted (either across the parallel interface or onto the media 761). For example, when the third processor receives a packet across the parallel interface (on internal bus 720), the packet is stored in a packet buffer area in RAM 702. The first processor may then access the packet in the buffer area and cause it to be transmitted across the internal bus onto the media 761 through communication port 708. Conversely, the message may be received through the communication port 708 and be processed by the first processor and placed in the packet buffers for forwarding across the parallel interface to the other half of the router.

Figure 9:
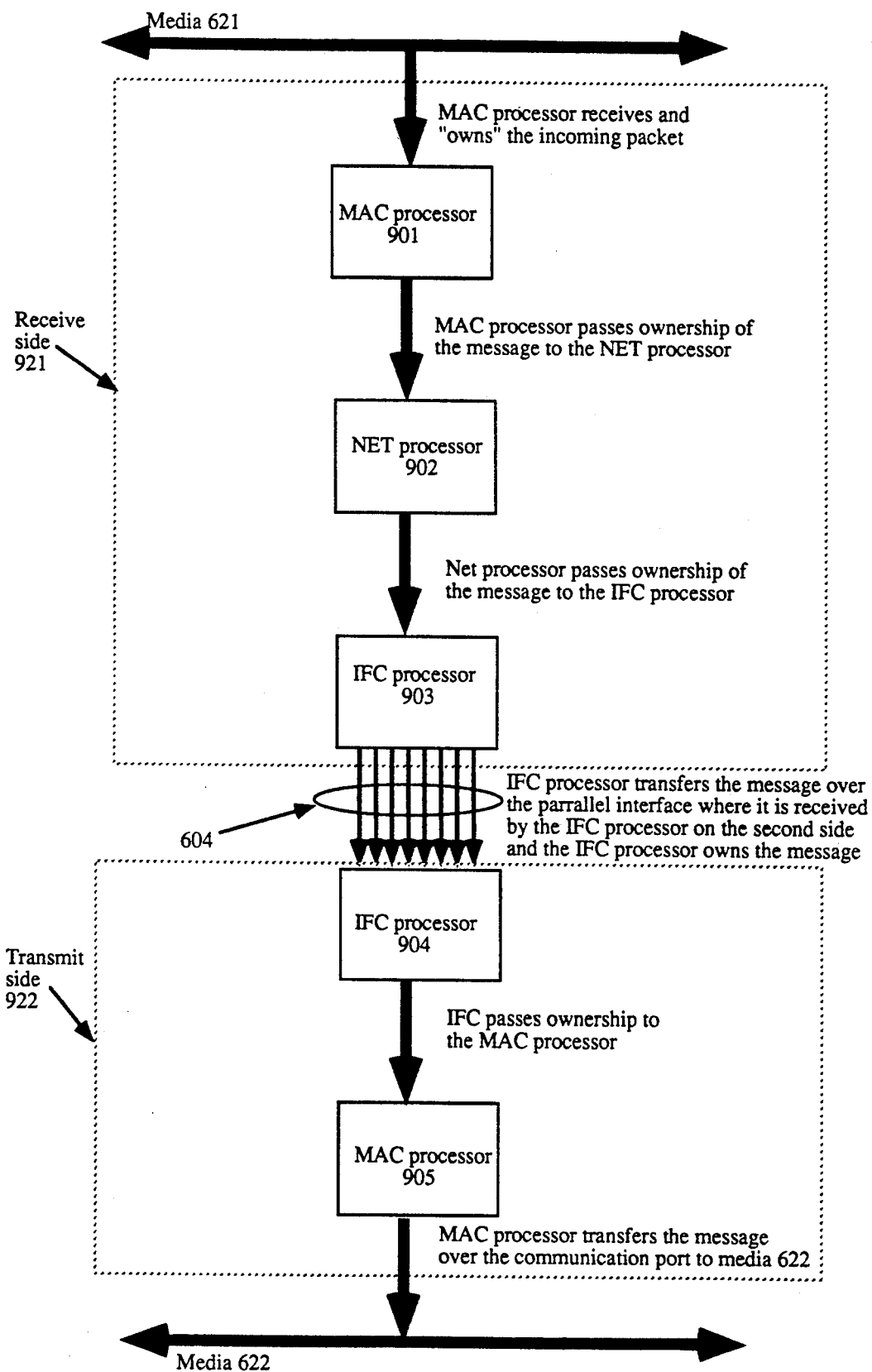
FIG. 9 is an illustration of message flow within a router node of the system of the present invention.

In order to facilitate this concept of passing responsibility of a message packet from one processor to another, a concept of packet ownership is adhered to in the system of the preferred embodiment. This concept is better illustrated with reference to FIG. 9. When a packet is received by a router on one side (referred to in FIG. 9 as the receive side 921) from media 621, the packet is initially considered to be owned and controlled by the MAC processor 901. The MAC processor processes the message by providing for typical MAC layer functions (the term MAC layer or Medium Access Control layer and the functions carried out by such a layer are well-known to one of ordinary skill and it is not necessary to detail these functions here) and by placing the message in a packet buffer in RAM 702.

Once the message is placed into the packet buffer, owneship is transferred to the NET processor 902. The NET processor 902 then determines whether the message should be processed by the node itself (certain messages, such as network management messages, may be intended for processing by the node itself rather than being intended to be forwarded), whether the message should be forwarded to the other side of the node, or whether the message should be dropped. The decision on whether the message should be processed by the node itself can be made based on whether the message is addressed to the router itself. If the message is addressed to the router itself, the message is then processed by the router, otherwise, the message is either forwarded or dropped. The decision on whether the message should be forwarded to the other side of the node or whether the message should be dropped is made based on the node's routing rules which are discussed in greater detail below.

If the message is to be forwarded, ownership is passed to the IFC processor 903 which prepares the message for transfer over the parallel interface 604 and then transfers the message. The message is then deleted from the packet buffer on the receive side 921.

The message is then received on the transmit side 922 of the router under control of the transmit side's IFC processor 904. The IFC processor 904 then places the message in a packet buffer in the transmit side's RAM and passes ownership to MAC processor 905. The MAC processor 905 then transfers the message over the communication port 708 onto media 622 and the message is deleted from the packet buffer.

GROUPS

Nodes in the network of the preferred embodiment are organized through installation procedures into groups-where a group is defined below in Table I as "a set of nodes which work together to perform a common function." Thus, FIG. 3 illustrates the network of FIG. 1, but adds the concept of a group, Group 1 301, which comprises two nodes—node 110 and node 118. In the illustrated example, both node 110 and 118 are organized within a single domain, domain 1 131; however, these two nodes are located on separate channels with node 110 being coupled to communicated on twisted pair wiring 161 and node 118 being coupled to communicate on power line 155. Thus, in order for the nodes 110 and 118 to communicate with each other (i.e., to communicate between members of their group, Group 1 301), messages must be passed through intervening routers.

For example, node 110 may communicate a message onto twisted pair media 161. The message may comprise information illustrated by FIG. 8 which includes source address information (source domain 801, source subnet 802, and source Node ID 803), destination address information 804, message type information 805 and other message message data 806. Importantly, as is now seen, the message includes address information for the source of the message as well as address information for the intended destination(s) of the message.

The address information for the intended destination(s) of the message will vary from message to message and will preferably comprise one of five address formats. These five address formats are described in greater detail with reference to Table III and allow routing to various destinations as shown in the table. When sending a group message, as illustrated by the present example, destination address format 4 is utilized to specify the domain id and group. The domain id in the exemplary message is specified as domain 1 and the group id as group 1.

The message is received by router node 114 on its first side (the side coupled with media 161) and router node 114 may then retransmit the message on its second side using radio transmission. The message is then received by node 119 on its first side (shown as coupled a radio frequency receptor/transmitter) and is retransmitted on node 119's second side onto power line 155. The message may then be received from media 155 by its intended recipient, node 118. Of course, this communication process deserves significantly greater discussion in order to allow for an appreciation of the present invention. This discussion will be facilitated by with reference to FIGS. 4(a)–(e).

REPRESENTATIVE TRANSMISSION OF A MESSAGE IN THE NETWORK OF THE PRESENT INVENTION

FIGS. 4(a)–(e) illustrates exemplary message transmissions in the system of the preferred embodiment.

Transmission of the group message onto media 161

Initially, node 110 may transmit a group message onto media 161. As has been just discussed, the message comprises source address information in addition to the destination address information (such as preferably described in connection with FIG. 8), block 401. This source address information includes information identifying node 110 as a being a member of subnet 1 102, and further identifying node 110 as being a member of domain 1 131.

The message is received by each of the other nodes coupled with media 161 (e.g., nodes 111–113 and router node 114).

When the packet is received by nodes 111–113, the network processing protocol programs executing on a processor in each of those nodes determines that the message is not intended for the respective node as it is a group message and the node is not a member of the specified group. The message is, therefore, ignored or dropped, block 411.

As was stated, the message is also received by router node 114 on the side of router node 114 coupled with media 161, block 402. It has already been explained in some detail above how the router receives and processes the message packet and allows the message packet to be retransmitted on its second side. To add to the description of the retransmission process, it is briefly stated here that the decision to retransmit the message is carried out in accordance with the routing rules implemented in the system of the preferred embodiment. Those rules, for group addressed messages, generally call for first examining the group forwarding tables (discussed below) to determine if the group message should be forwarded and then examining the source subnet field 802 of the message to determine if the source subnet is on the receive or transmit side of the router (see FIG. 9 for a description of the receive and transmit sides of the router), blo If the source subnet is on the receive side of the router, the message is retransmitted. If the source subnet is on the transmit side of the router, the message is not retransmitted. By not retransmitting messages where the source subnet is on the transmit side of the router, unnecessary retransmission of messages is avoided as it can be assumed that such messages have previously been transmitted on the subnet on that side of the router.

(It is noted that, in fact, in the implementation of the preferred embodiment, both the source subnet field 802 and the source domain field 801 are examined to determine if the message should be forwarded. It is important in the system of the preferred embodiment to examine both the source subnet field 802 and source domain field 801 because subnet numbers may be duplicated from domain to domain. There are also other routing rules which are followed by the system of the preferred embodiment. For sake of simplifying the example given here, the system will be described as examining the source subnet field 802 in making the routing decision-however, it is understood that, in fact, the routing rules explained in greater detail below are followed.)

Retransmission of the group message onto power line 155 by router node 119

If the message is to be retransmitted (as determined by the routing rules which are expressed in routing table, such as table 611 or 612 stored in the on-board EEPROM 701), block 404, it is retransmitted on the second side, block 405. In the illustrated example, this retransmission is done using radio frequency transmission from the second side of node 114. Of course, the radio signals are intended to be received by router node 119 for retransmission on power line media 155 so that the message will eventually be received by node 118. Processing of the message by router node 119 will be discussed below.

However, before discussing processing by router node 119, it is pointed out that the message may also be received by router node 116 and router nodes 122 and 125, blocks 407 and 408, respectively. Processing by nodes 122 and 125 will be discussed first as that is the relatively simple case; this discussion will be followed by a discussion of processing by node 119, and finally by a discussion of processing by node 116.

It is pointed out that according to the routing rules of the preferred embodiment, if the message had been originated by a node with an address of source subnet 1, the message would not have been retransmitted by router node 114, block 409.

Processing by node 122—FIG. 4(*d*)

FIG. 4(*d*) details the process followed in the case of the message being received by nodes 122 or 125. In the following discussion, for simplicity, only node 122 will be specifically discussed with the understanding that processing by node 125 is similar.

Node 122 examines the source subnet address information to determine if the message should be retransmitted on its transmit side, block 471. In the case of the present example, the routing rules provide for retransmission of the message because it cannot be determined by node 122 whether any member of the group specified by the group message are coupled with a twisted pair wiring 162. Therefore, a determination is made that the message should be retransmitted, block 472, and node 122 retransmits the message onto media 162, block 473. The message is then received by each of nodes 120–124 and, as these nodes are not members of group 1, the message is ignored, block 475.

Of course, if the message had been originated by a node with an address of source subnet 2, the message would not have been retransmitted by router node 122, block 482. It is also understood that, in accordance with the routing rules of the preferred embodiment, because node 122 is not a member of domain 1 131, in the system of the preferred embodiment, node 122 would not, in fact, retransmit the message. Similarly, in the system of the preferred embodiment, node 125 would not retransmit the message because it is also not a member of domain 1 131.

Processing by node 119—FIG. 4(*b*)

Initially, when node 119 receives the message it examines the source subnet field 802 to determine if the message should be retransmitted, block 421. The apparatus and methods for carrying out this examination have already been well-discussed. If the message should be retransmitted, block 422, node 119 retransmits the message and the message is received by node 118, block 424 where the message is processed, block 431.

The message is also received by nodes 117 and 126–128. Each of nodes 117 and 126–128 ignore the message because none of these nodes are members of group 1. In addition, in the system of the preferred embodiment, nodes 126–128, as well as router node 125 will ignore the message because these nodes are not members of domain 1 131.

Finally, the message is also received by router node 116. Node 116 follows its routing rules to determine whether the message should be retransmitted. In the particular case, the message will, likely, not be retransmitted because it will be determined that the source subnet lies on the destination side of the router. These rules are discussed in greater detail below.

It should be noted that if the source subnet field 802 had indicated the source subnet was subnet 2, according to the routing rules thus far discussed, the message would not have been retransmitted by node 119.

Figure 4A:
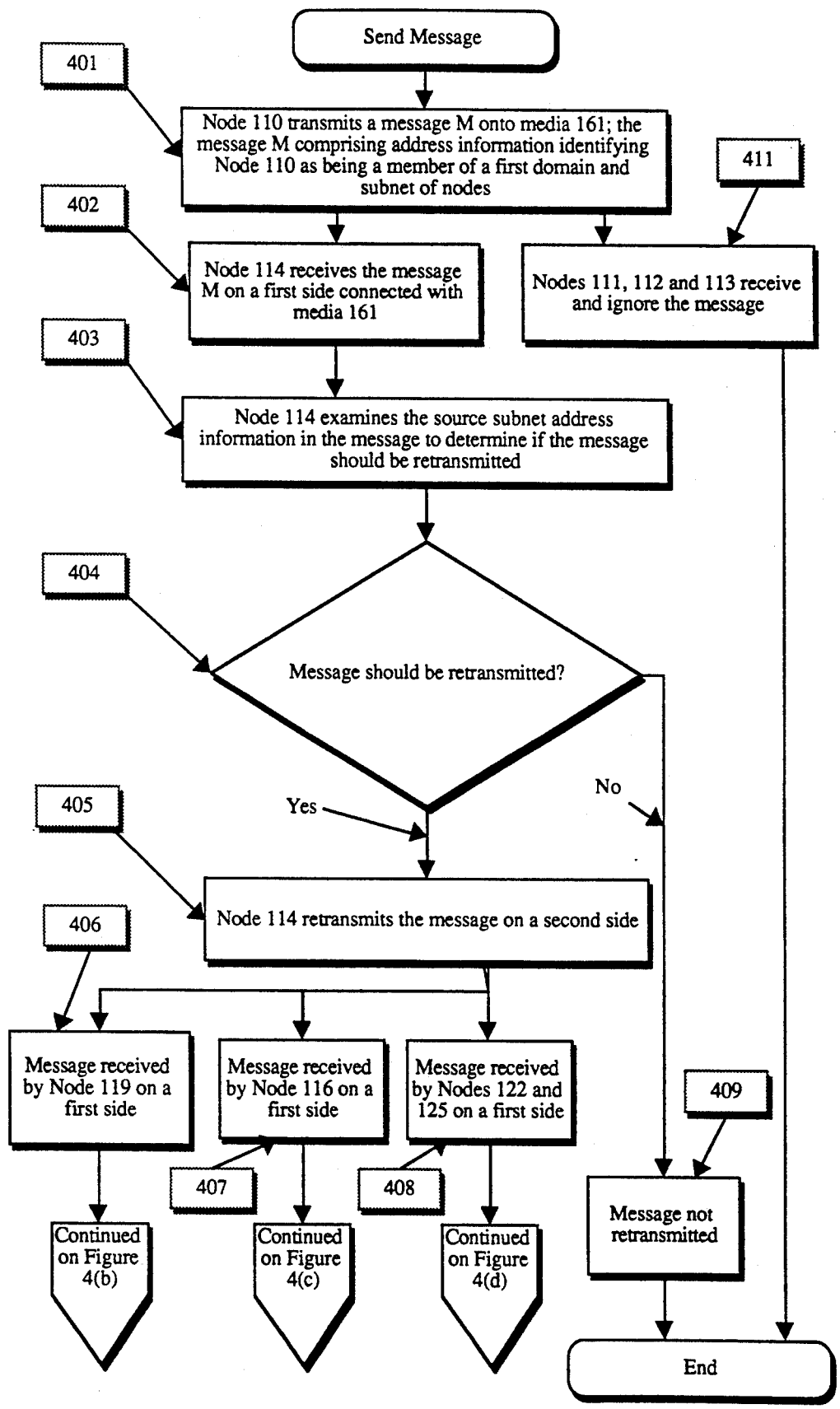
FIGS. 4(a) through 4(e) are each flow diagrams illustrating message flow in the system of the present invention.
Figure 4B:
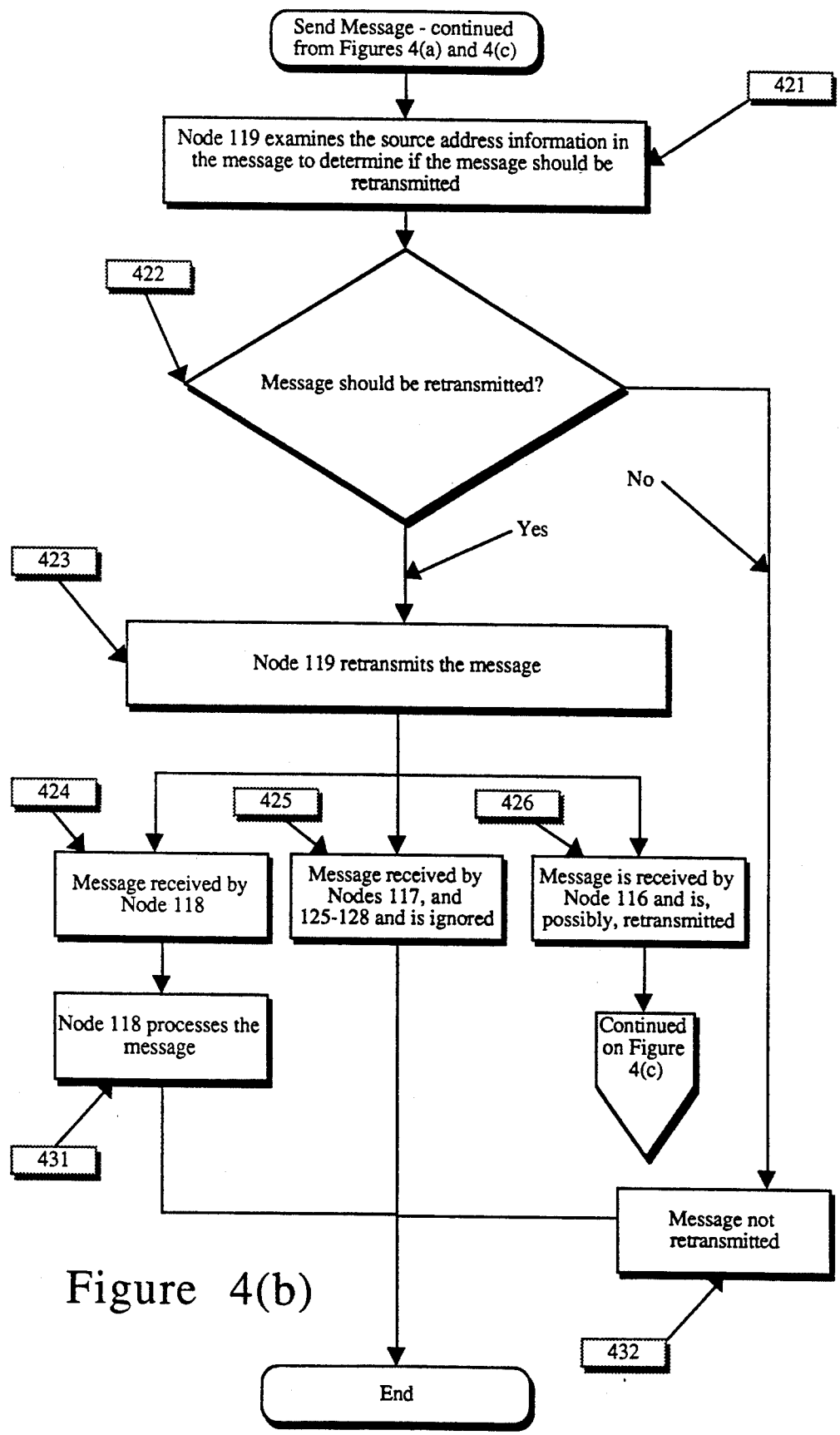
Figure 4C:
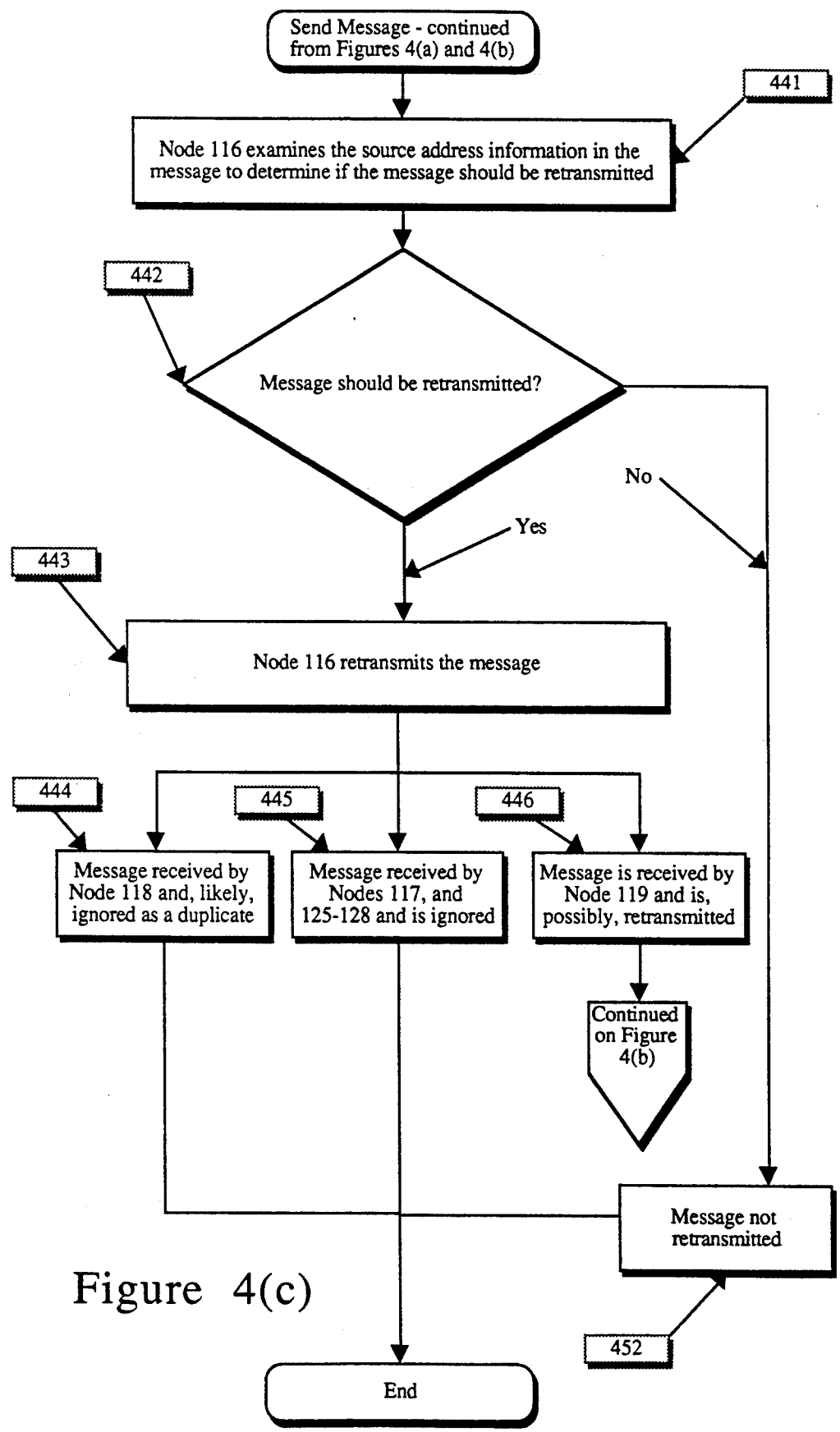
Figure 4D:
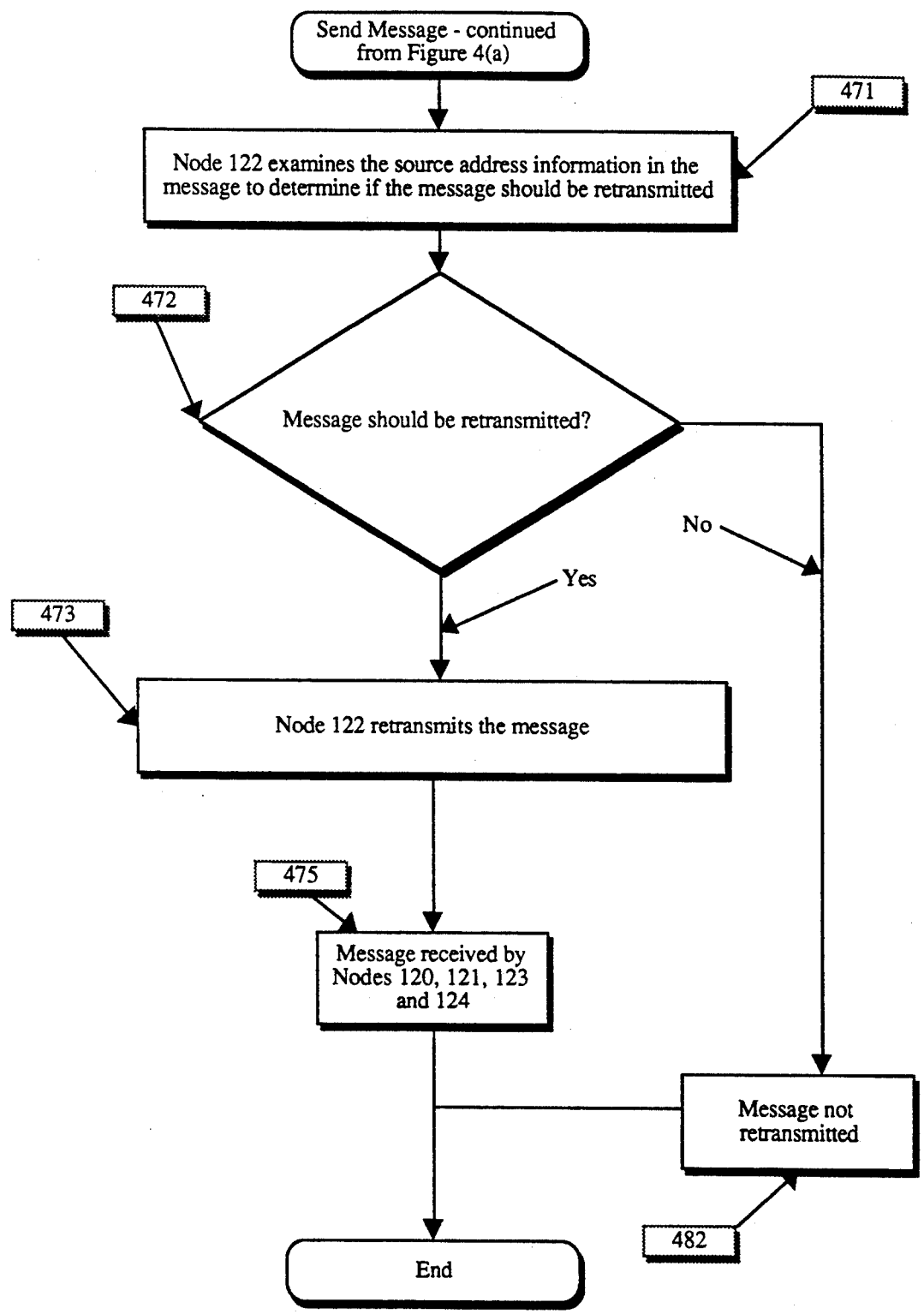

Processing by node 116—FIG. 4(c)

When router node 116 first receives a message, it examines the source subnet field 802 to determine if the message should be retransmitted. As has been seen, node 116 may receive the message on both of its two sides-likely first receiving the message when transmitted in radio wave form from node 114 on a first of its two sides and, then again receiving the message when it is retransmitted onto the power line media 155 by node 119 on a second of its two sides. In the case of the message being received in radio wave form from node 114, node 116 initially examines the source subnet information in the message to determine if the message should be forwarded.

In this case, the routing rules call for forwarding the message as the originating source subnet was on receive side of the router and the decision is made to retransmit the message, block 442. Therefore, router node 116 retransmits the message, block 443. When the message is retransmitted, it is received by node 118 and, likely, ignored as a duplicate, block 444. It is also received by nodes 117 and 126-128 which all ignore the message, block 445. Finally, the message is received by router node 119, block 446. Router node 119 processes the message as illustrated in FIG. 4(b) and, in this case, the decision is made not to retransmit the message, block 422.

Now, when the message is again received on router node 116's other side from power line media 155, node 116 again examines the source subnet information in the message to determine if the message should be forwarded, block 441. In this case, the determination is made that the message should not be forwarded, block 442. The message is, therefore, not retransmitted, block 452.

Figure 4E:
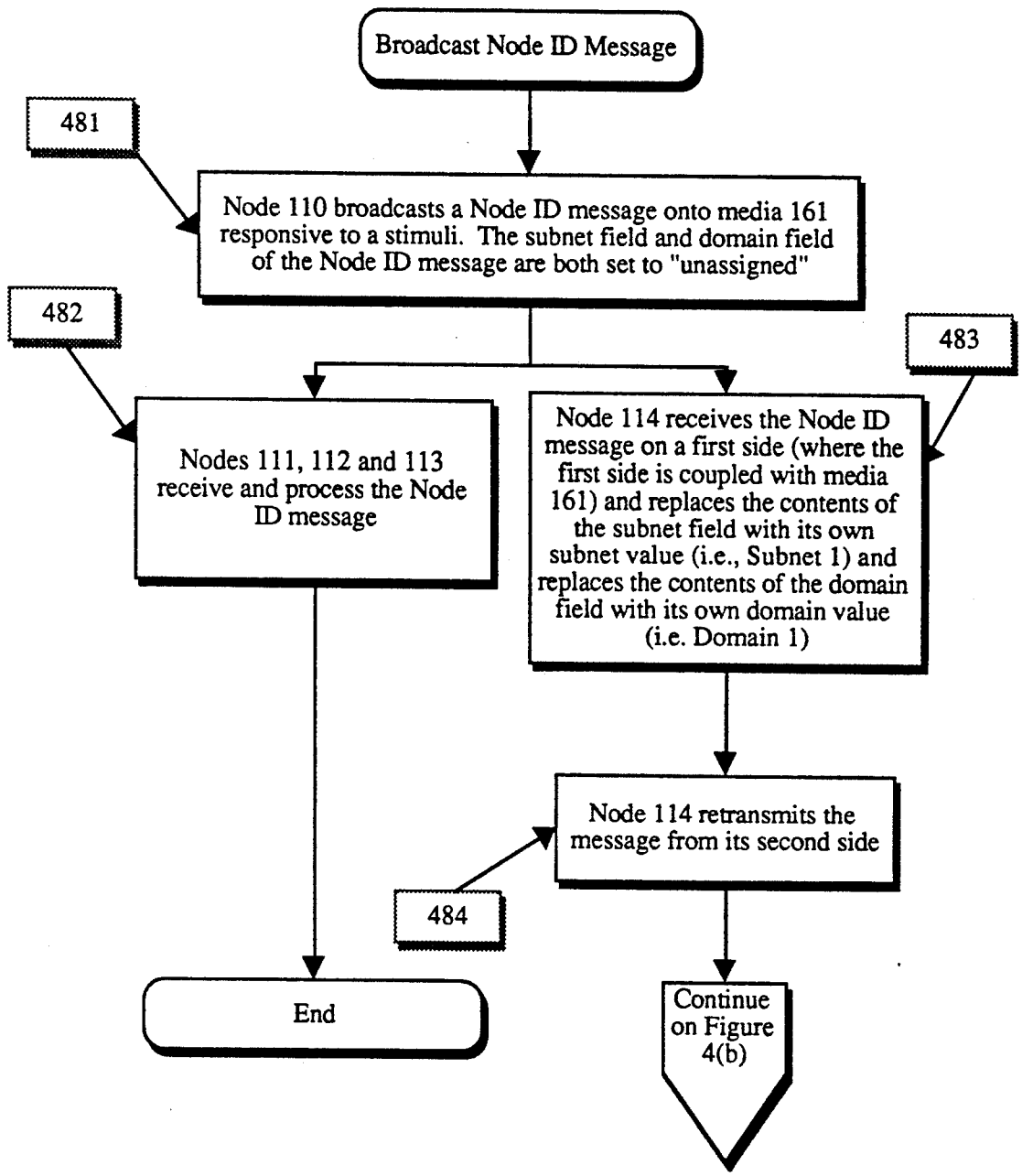

Broadcast Node ID messages—FIG. 4(e)

It has been noted above that the system of the preferred embodiment provides for the ability of a node to transmit it a message on the media responsive to a stimuli including its unique Node ID. This feature of the system of the present invention is often used when configuring nodes of the network in order to obtain a node's Node ID as part of the configuration process. However, when a node is unconfigured, it has not yet been assigned a subnet number or domain. Therefore, the source domain field 801 and source subnet field 802 are set to a value indicating these fields are currently unassigned. In the preferred embodiment, the value used is zero; but it is pointed out that in alternative systems other values may be used without departure from the spirit and scope of the present invention.

It can be appreciated that in the system which has been described above which determines routing requirements at least in part based on the source subnet and source domain fields 801 and 802, transmitting a message having these fields set to "unassigned" will lead to difficulties. Therefore, another aspect of the present invention is described with reference to FIG. 4(e) which illustrates the process for broadcasting a Node ID message where the source node is unconfigured. In the example, node 110 is assumed to be an unconfigured node.

Node 110 initially broadcasts a Node ID message message onto media 161 responsive to a stimuli, as has been described. The source subnet field 802 and source domain field 801 are both set to a value indicating these fields are unassigned; in the preferred case, these fields are each set to zero, block 481.

Each of nodes 111, 112 and 113 receive the Node ID message and process or ignore depending on their particular programming, block 482.

Router node 114 also receives the Node ID message on a first side (in this case, the side coupled with media 161). Router node 114 then replaces the contents of the source domain field 801 with its own domain value (i.e., in the example, the source domain field 801 will now be set to "Domain 1") and router node 114 replaces the contents of the source subnet field 802 with its own subnet value (i.e., in the example, the source subnet field 802 will be set to "Subnet 1"), block 483. The routing of the message then follows the regular routing rules; therefore, node 114 then retransmits the message from its second side, block 484.

The message, retransmitted from node 114's second side, is then processed by the receiving nodes in the manner previously described in connection with FIG. 4(e).

ROUTING RULES

Up to two domains defined per router

Before continuing, it is worthwhile to point out that in the preferred embodiment of the present invention, each router may be configured to be a member of up to two separate domains. This allows greater flexibility in configuring networks of the preferred embodiment. The routing rules, described below, take into account this capability.

In the preferred embodiment of the present invention, as was described earlier in connection with FIG. 6, each router node includes, in each of its halves, a routing table 611 and 612. In fact, the preferred embodiment includes three tables in each half—a first routing table having therein subnet information for a first domain, a second routing table having therein subnet information (referred to collectively with the first routing table as the "subnet routing table") for a second domain, and a third routing table having group information (the "group routing table").

Subnet routing tables

The subnet routing tables are used for routing messages in which the destination is referred to by a subnet number (i.e., formats 2 and 3 of Table III, below). The preferred embodiment of the present invention allows up to 255 subnets per domain. Each subnet routing table contains a flag for each of the 255 subnets in the domain associated with the table and serviced by the router. The flag indicates if messages destined for that subnet are to be forwarded by the router (if the flag is set in the preferred embodiment, the message is to be forwarded).

Group routing table

The group routing table is used for routing messages in which the destination nodes are referred to by a group number (i.e., format 4 of Table III, below). The preferred embodiment of the present invention allows up to 256 groups per domain. The group routing table contains a flag for each of the 256 groups in the domain which indicates if messages destined for that group are to be forwarded by the router (if the flag is set in the preferred embodiment, the message is to be forwarded).

Addressing modes

Table II, below, illustrates the various addressing modes of the system of the preferred embodiment and the routing rules implemented to facilitate routing of messages using those addressing modes. The addressing mode used by a message is defined in the message by its destination address information 804.

Address mode 1 (sometimes referred to as broadcast addressing) allows routing to all nodes in a particular domain. Routers will forward messages using this address mode if the router is a member of the specified destination domain and if the other routing rules of the system of the preferred embodiment are met. These other routing rules will be discussed in greater detail below. Optionally, a destination subnet may be specified. In this case, the router must be a member of the destination domain and destination subnet in order to forward the router. If a router receives a message destined for a domain/subnet other than the domain/subnet serviced by the router, the message is not retransmitted.

Address mode 2 (sometimes referred to as unicast addressing) requires that a check be made of the subnet table of the receive side of the router to determine if the forward flag for the destination subnet specified in the message is set. If the forward flag is set, the message is intended to be forwarded. However, in accordance with one inventive aspect of the system of described herein, before forwarding the message, a check is made to determine if the source subnet is on the transmit side of the router. This will be discussed in greater detail below in connection with FIG. 5. In addition to checking the subnet table, a check is made to determine if the destination domain/subnet matches the domain/subnet of the router.

Address mode 3 (sometimes referred to as multicast addressing) requires that a check be made of the group table of the receive side of the router. If the group table forward flag for the group specified by the destination address indicates the message is to be forwarded, the message is forwarded if the source subnet is not on the transmit side of the router. Again, the source subnet is checked against the subnet table to determine if the source subnet is on the destination side of the router and the destination domain is checked to determine if the domain of the router matches.

Finally, address mode 4 (sometimes referred to as the unique ID mode) illustrates an addressing mode in which the unique 48-bit id of the destination node is specified. After determining whether the source subnet lies on the destination side of the router, and otherwise following the routing rules described herein, messages using this addressing mode are forwarded.

Check if destination domain matches the domain of the router

Figure 5:
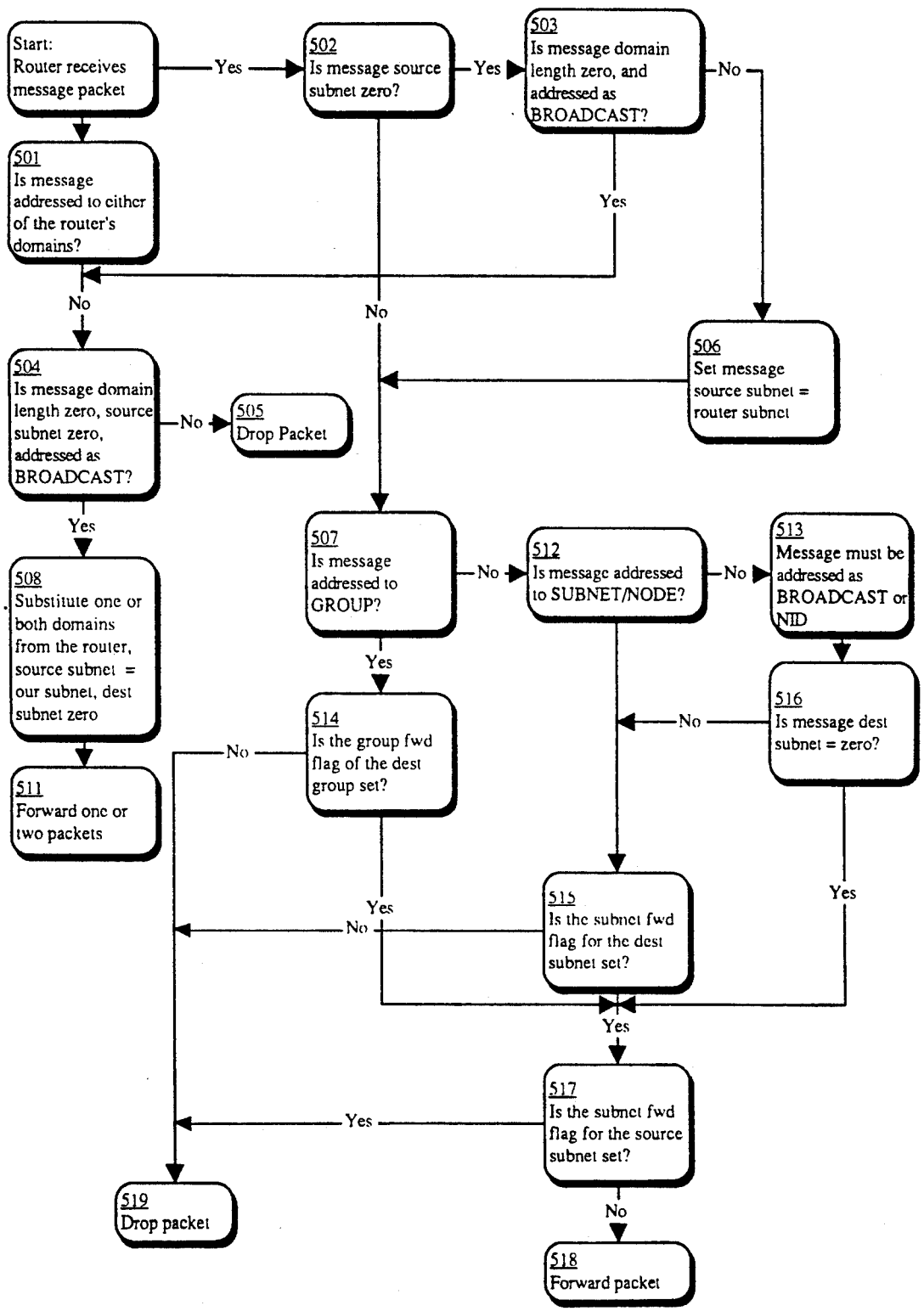
FIG. 5 is a flow diagram illustrating certain routing rules implemented by the system of the present invention.

It is now time to turn to FIG. 5 which is a flow diagram illustrating the routing rules implemented by routers in the preferred embodiment of the present invention. As has been discussed above, in the first three addressing modes, a check is done to determine if the destination domain (and, if specified, the destination subnet) match the domain/subnet of the router, block 501. It is again noted that each router in the system may be configured to be a member of up to two domains. Therefore, this check is performed against each of these domains.

The system of the preferred embodiment allows nodes to send broadcast messages without specifying a destination domain. If the message is a broadcast message and the destination domain and source subnet are specified as a special value (in the preferred embodiment, the special value is represented as a zero length value in the destination domain field and a zero in the source subnet field). If the special value is not present in these fields, the packet is dropped by the router, block 505. Otherwise, the router substitutes its own domain information for the special value in the destination domain field and substitutes its own subnet for the source subnet and forwards the packet, block 511. In the event that the router is configured as a member of two domains, the packet is forwarded twice—the first time specifying the first domain of which the router is a member and the second time specifying the second domain.

Check if the source subnet is undefined

Importantly, as has been discussed, in the system of the preferred embodiment, a node may be allowed to transmit messages onto the network without having yet been configured to be a member of a particular subnet. Therefore, when a message is received which is addressed to one of the domains serviced by the router, a check is done to determine if the source subnet is defined in the message (unconfigured nodes transmit messages with the source subnet field set to zero), block 502.

In the case of messages which are transmitted with the source subnet set to zero, a check is done to determine if the domain length is also zero and if the message is a broadcast message, block 503. If it is, processing continues as described above in connection with block 504. This test is necessary because routers may be configured as being members of domain length zero.

As one important aspect of the present invention, assuming the domain length is not zero, the router sets the source subnet field 802 to its own subnet value, block 506, and sets the source domain field to its own domain. This step is important in prevention of unnecessary rerouting of messages in the system of the preferred embodiment and, further, allows nodes to initially be installed in an unconfigured state and allows such unconfigured nodes to communicate on the network. In messages transmitted by unconfigured nodes, the source subnet field 802 and source domain field 801 are both set to an unconfigured value. In the preferred embodiment, this value is zero. In the system of the preferred embodiment, substitution of the router's address information for the source address information (as accomplished by block 506) is only done when the message was originated by an unconfigured router and if the message was received directly from the origin node (because if the message had been previously received an retransmitted by another router node, that node would have done the substitution).

Group message forwarding algorithm

Message retransmission depends on the type of addressing mode of the message. Beginning with group addressing, block 507, a check is made of the group table to determine if messages destined for the group are to be forwarded by the router, block 512. This is accomplished by checking the group table on the receive side of the router to determine if the forward flag for the destination group address in the message is set. If the flag is not set, the message is not forwarded by the router and the packet is dropped, block 519.

If the flag is set, as another important aspect of the present invention, a check is made to determine if the source subnet is on the destination side of the router, block 517. This is preferably accomplished by checking the subnet forward flag in the subnet routing table for the specified domain on the receive side of the router. If the flag is not set, the source subnet is determined to not be on the destination side of the router and the packet is forwarded, block 518. If the flag is set, source subnet is determined to be on destination side of the router and the packet is dropped, block 519. This aspect of the present invention significantly reduces the possibility of infinite loops being created when routing messages in the network of the present invention and generally reduces the number of unnecessary retransmissions of messages in the system of the present invention.

Unicast message forwarding algorithm

Processing for messages using subnet addressing, block 512, is similar to processing for messages using group addressing. However, instead of checking the group forward flag, a check is made of the subnet forward flag for the destination subnet in the subnet routing table, block 515. If the forward flag for the destination subnet is set, then processing continues as has been described in connection with the description of block 517 above. Otherwise, the message is not forwarded by the router and the packet is dropped.

Broadcast message /Unique ID forwarding algorithm

Routing of messages using broadcast messaging or unique ID messaging is handled similarly, block 513. If the destination subnet is specified as zero, block 516, the processing continues as described above in connection with block 518. Otherwise, if a destination subnet is specified, processing continues as specified above in connection with block 515.

Thus, what has been described is an improved method of routing messages in a networked system in which method there is achieved reduced unnecessary retransmission of messages.

TABLE I

GENERAL DEFINITIONS

The following definitions are generally applicable to terms used in this specification:

| | |
|---|---|
| Addressing - | The present invention provides for a hierarchical address structure and supports three basic addressing modes: (1) (Domain, Subnet, Node number); (2) (Domain, Subnet, Node_id); and (3) (Domain, Group). |
| Channel - | Nodes within a network are coupled together on communications media, for example, a power line or telephone line. In a typical network, there may be one or more channels. Communication between channels in a network is accomplished by routing messages through a bridge or router node. There may be a one-to-many relationship between channels and domains and a one-to-many relationship between domains and channels. |
| Domain: | The term "domain" is used to describe a virtual network wherein all communication, as supported by the network of the present invention, must be within a single domain. Any required inter-domain communication must be facilitated by application level gateways. |
| Domain addresses: | In the preferred embodiment, domains are identified with 48-bit domain identifiers. However, in certain applications the size of the domain field may vary. |
| Group: | A group is a set of nodes which work together to perform a common function. In the preferred embodiment, groups are identified with an 8-bit group identification number. A single domain may contain up to 256 groups. |
| Node: | A node is an intelligent, programmable element providing remote control, sensing, and/or communications, that when interconnected with other like elements forms a communications, control and/or sensing network. Nodes are named with Node ids (see below). Nodes may be addressed as a part of a domain and subnet using a node number. The node number in the preferred embodiment is 7 bits. Multiple nodes may be addressed using a group id. The group id in the preferred embodiment is 8 bits. |
| Node id: | Nodes in the present invention are assigned a unique identification number at the time of manufacture. The identification number is preferably 48-bits long. This 48-bit identification number does not change during the lifetime of node. As is appreciated, the assignment of a unique identification to each individual node allows for numerous advantages. This 48-bit identification number may be referred to as the Node id. |
| Subnet - | In the preferred embodiment, a subnet is a subset of a domain containing from 0 to 127 nodes. In the preferred embodiment, subnets are identified with an 8-bit subnet identification number. A single domain may contain up to 255 subnets. |

TABLE II

FORWARDING RULES

The following destination address formats are forwarded by routers of the system of the preferred according to the stated forwarding rules:

| ADDRESS MODE # | ADDRESS FORMAT | FORWARDING RULES |
|---|---|---|
| 1 - Broadcast | Domain (and, optionally subnet) | If the source address information = 0, first modify the source address information; then, if the destination domain matches a domain of which the router node is member, forward (if destination subnet is specified, router node must be a member of the specified subnet also.) |
| 2 - Unicast | Domain Subnet Node | If source address information = 0, then modify the source address information; then, if destination domain matches perform a subnet table check |
| 3 - Multicast | Domain Group | If source address information = 0, then modify the source address information; then, if destination domain matches perform a group table check, then forward the message |
| 4 - Unique ID | Unique 48-bit ID | If source address information = 0, then modify the source address information; then forward the message |

TABLE III

ADDRESS FORMATS

The following four generalized address formats are utilized for transmission of messages in the system of the preferred embodiment:

| FORMAT #/ Type | ADDRESS FORMAT (Destination address information) | DESTINATION |
|---|---|---|
| 1 - Broadcast | Domain (and, optionally, subnet) | All nodes in the specified domain |

TABLE III-continued
ADDRESS FORMATS
The following four generalized address formats are utilized for transmission of messages in the system of the preferred embodiment:

| FORMAT #/ Type | ADDRESS FORMAT (Destination address information) | DESTINATION |
|---|---|---|
| | | (if subnet information is included, only nodes in the specified destination domain/subnet. |
| 2 - Unicast | Domain Subnet Node | The specified node within the indicated subnet and domain |
| 3 - Multicast | Domain Group | All nodes within the specified group |
| 4 - Unique ID | Unique 48-bit ID | The specified node |

What is claimed is:

1. A network for communicating information, said network comprising:
   (a) a first node for communicating information, said first node being a member of a first subnet of nodes, said communicated information comprising address information of said first node, said address information including information identifying said first subnet of nodes;
   (b) a second node for receiving said communicated information, said second node being a member of a second subnet of nodes;
   (c) a third for receiving said communicated information from said first node and for routing said communicated information to said second node, said third node having:
      (i) a first side coupled to receive communicated information from said first subnet of nodes,
      (ii) a second side coupled to communicate communicated information to said second subnet of nodes,
      (iii) determining means for determining whether or not communicated information received on said first side was originated by a node on said second side, and
      (v) control means for controlling retransmission of said communicated information, said control means allowing retransmission of said communicated information when said determining means indicates said communicated information was not originated by a node on said second side.

2. The network as recited by claim 1 wherein said communicated information is a group message destined for members of a first group, said first node and said second node being members of said first group.

3. The network as recited by claim 1 wherein said determining means accesses a subnet table to determine whether or not communicated information received on said first side was originated by a node on said second side.

4. The network as recited by claim 3 wherein said subnet table comprises one entry for each possible subnet in a domain of the third node, one of said entries comprising a flag indicating whether messages for one of said subnets are to be forwarded by said third node.

5. In a networked system, said networked system comprising a first node, a second node and a third node, said first node being a member of a first set of nodes, said second node being a member of a second set of nodes, said first set of nodes coupled in communication with said second set of nodes through said third node, said first node capable of transmitting a message to said second node, said message comprising address information of said first node, said address information comprising a first field identifying said first set of nodes, wherein said third node comprises:
   (i) a first side coupled to receive said message from said first node;
   (ii) a second side coupled to transmit said message to said second node,
   (iii) determining means for determining whether or not communicated information received on said first side was originated by a node on said second side; and
   (iv) control means for controlling retransmission of said message, said control means disallowing retransmission of said message if said determining means determines that said message was originated by a node on said second side.

6. The network as recited by claim 5 wherein said communicated information is a group message destined for members of a first group, said first node and said second node being members of said first group.

7. The network as recited by claim 5 wherein said determination means accesses a subnet table to determine whether or not communicated information received on said first side was originated by a node on said second side.

8. The network as recited by claim 7 wherein said subnet table comprises one entry for each possible subnet in a domain of the third node, one of said entries comprising a flag indicating whether messages for one of said subnets are to be forwarded by said third node.

9. A method for the communicating of information in a network comprising the steps of:
   (a) communicating information from a first node onto a media, said first node being a member of a first subnet of nodes, said communicated information comprising address information identifying said first subnet;
   (b) a second node receiving said communicated information from said first node, said second node having:
      (i) a first side coupled to communicate messages to said first subnet,
      (ii) a second side coupled to communicate messages to a second subnet,
      (iii) determining means for determining whether or not communicated information received on said first side was originated by a node on said second side,
      (v) control means for controlling retransmission of said communicated information to a third node, said control means disallowing retransmission of said message if said determining means determines that said message was originated by a node on said second side; and
   (c) said third node receiving said communicated information when said communicated information is retransmitted, said third node being a member of a second subnet of nodes.

10. The method as recited by claim 9 wherein said communicated information is a group message destined for members of a first group, said first node and said third node being members of said first group.

11. The network as recited by claim 9 wherein said determination means accesses a subnet table to determine whether or not communicated information received on said first side was originated by a node on said second side.

12. The network as recited by claim 11 wherein said subnet table comprises one entry for each possible subnet in a domain of the third node, one of said entries comprising a flag indicating whether messages for one of said subnets are to be forwarded by said third node.

13. A networked system comprising:
(a) a first node coupled with a media for transmitting a message onto said media, said message comprising address information, said address information comprising a subnet field, said subnet field representing a value, said first node setting said subnet field to a first value indicating said first node has not yet been assigned to a subnet;
(b) a router node for receiving and retransmitting said message, said router node replacing said first value with a second value; and
(c) a third node for receiving said retransmitted message.

14. The network system as recited by claim 13 wherein said address information further comprises a domain field, said domain field being set to a third value by said first node, said third value indicating said first node has not yet been assigned to a domain and wherein said router node further replaces said third value with a fourth value.

15. The network as recited by claim 13 wherein said second value is set to a value corresponding with said subnet.

16. The network as recited by claim 13 wherein said first value is zero.

17. The network as recited by claim 14 wherein said fourth value is set to a value corresponding with a first domain which said router is a member of.

18. A method for retransmission of messages in a networked system comprising the steps of:
(a) a first node transmitting a message onto a media, said message comprising address information, said address information comprising a subnet field, said subnet field representing a value, said first node setting said subnet field to a first value indicating said first node has not yet been assigned to a subnet;
(b) a router node receiving and retransmitting said message, said router node replacing said first value with a second value; and
(c) a third node for receiving said retransmitted message.

19. The method as recited by claim 18 wherein said address information further comprises a domain field, said domain field being set to a third value by said first node, said third value indicating said first node has not yet been assigned to a domain and wherein said router node further replaces said third value with a fourth value.

20. The method as recited by claim 18 wherein said second value is set to a value corresponding with said subnet.

21. The method as recited by claim 20 wherein said first value is zero.

22. The method as recited by claim 19 wherein said fourth value is set to a value corresponding with a first domain which said router node is a member of.

23. The method as recited by claim 22 wherein said fourth value is set to a value corresponding with a first domain which said router node is a member of.

* * * * *

UNITED STATES PATENT AND TRADEMARK OFFICE
CERTIFICATE OF CORRECTION

PATENT NO.    :  5,327,426
DATED         :  July 5, 1994
INVENTOR(S)   :  Dolin et al.

It is certified that error appears in the above-identified patent and that said Letters Patent is hereby corrected as shown below:

In column 5 at line 65 insert --or a residential building-- following "building" and prior to "and"

In column 9 at line 37 delete "owneship" and insert --ownership--

Signed and Sealed this

Fourteenth Day of October, 1997

Attest:

BRUCE LEHMAN

Attesting Officer

Commissioner of Patents and Trademarks